US005520767A

United States Patent [19]
Larson

[11] Patent Number: 5,520,767
[45] Date of Patent: May 28, 1996

[54] COMPOSITIONS FOR BONDING ORGANOSILOXANE ELASTOMERS TO ORGANIC POLYMERS

[75] Inventor: Kent R. Larson, Midland, Mich.

[73] Assignee: Dow Corning Corporation, Midland, Mich.

[21] Appl. No.: 369,628

[22] Filed: Jan. 6, 1995

Related U.S. Application Data

[62] Division of Ser. No. 251,145, May 31, 1994, Pat. No. 5,459,194.

[51] Int. Cl.$^6$ ...................................................... C09J 5/02
[52] U.S. Cl. ........................ 156/307.5; 156/329; 524/380; 525/100
[58] Field of Search ................................ 156/307.5, 329; 524/380; 525/100

[56] References Cited

U.S. PATENT DOCUMENTS

| | | | |
|---|---|---|---|
| 4,147,685 | 4/1979 | Smith | 525/100 |
| 4,795,775 | 1/1989 | Baile et al. | 524/379 |

*Primary Examiner*—John J. Gallagher
*Attorney, Agent, or Firm*—Robert Spector

[57] ABSTRACT

Liquid adhesion-promoting compositions for cohesively bonding organosiloxane materials to organic polymers comprise (A) a copolymer derived from at least one ethylenically unsaturated organic compound and at least one silane containing an ethylenically unsaturated organic group and at least two silicon-bonded hydrolyzable groups per molecule, (B) an organohydrogensiloxane, (C) an aminosilane containing at least 2 alkoxy or other hydrolyzable groups, and (D) an amount of an organic liquid sufficient to solubilize ingredients A, B and C of said composition and achieve the desired viscosity.

6 Claims, No Drawings

COMPOSITIONS FOR BONDING ORGANOSILOXANE ELASTOMERS TO ORGANIC POLYMERS

This is a divisional of application Ser. No. 08/251,145 filed on May 31, 1994, now U.S. Pat. No. 5,459,194.

BACKGROUND OF THE INVENTION

1. Field of the Invention

This invention relates to adhesion promoting organosiloxane compositions. More particularly, this invention relates to adhesion-promoting compositions that cohesively bond cured organosiloxane materials such as elastomers and resins to organic polymers during curing of the materials by a hydrosilation reaction or by the reaction of silanol groups with hydrolyzable groups such as alkoxy in the presence of moisture. The compositions do not contain the objectionable ingredients associated with prior art adhesion promoting compositions.

2. Background Information

U.S. Pat. No. 4,719,262, which issued to Edwin Plueddemann on Jan. 12, 1988 describes organosilicon compounds useful as primers. One group of organosilicon compounds comprises bis-silylalkanes of the formula $(OR'')_{3-x}(R'O)_x SiRSi(OR')_x(OR'')_{3-x}$ where R represents an alkylene radical, OR' represents an alkoxy group, OR'' represent substituted or unsubstituted alkenyloxy, alkenyloxyalkoxy, or carboalkenyloxyalkoxy groups, where the ethylenic unsaturation is located at terminal carbon atoms, and x is 1 or 2. This patent also teaches improving the performance of the disclosed organosilicon compounds as bonding agents by combining them with (A) copolymers derived from 1) ethylenically unsaturated organic compounds such as esters of acrylic and methacrylic acids, and 2) ethylenically unsaturated alkoxysilanes, and (B) organohydrogensiloxanes as crosslinking agents for the copolymer.

The copolymers referred to as A in the aforementioned patent are described in U.S. Pat. No. 3,306,800, hereinafter referred to as the '800 patent, which issued to Edwin Plueddemann on Feb. 26, 1967.

Primers and adhesion promoters containing the combination of the aforementioned ingredients A, B and the bis-silylalkanes described in the Plueddemann patent U.S. Pat. No. 4,719,262 provide excellent adhesion between organosiloxane elastomers and amorphous organic polymers such as polymerized esters of acrylic or methacrylic acids, polycarbonates and polystyrene. Primer compositions containing these ingredients in combination with a solvent selected from ethylenically unsaturated alcohols containing from 4 to 6 carbon atoms are described in U.S. Pat. No. 4,795,775, which issued on Jan. 3, 1989.

A disadvantage that may prevent wide acceptance of adhesion promoting compositions described in U.S. Pat. Nos. 4,795,775 and 4,719,262 is the toxicity of some organosilicon compounds containing the bis-silylalkyl group that are used to prepare the adhesion-promoting ingredient described in these patents. This disadvantage has stimulated a search for less toxic organosiloxane adhesion promoters suitable for use with organosiloxane elastomers that cure by a platinum catalyzed hydrosilation reaction and by the reaction of silanol groups with alkoxy or other silicon-bonded hydrolyzable groups in the presence of moisture and a suitable catalyst.

Primer compositions containing various combinations of organosilicon compounds with alkyl orthosilicates and/or organohydrogensiloxanes are described in the prior art.

Coatings formed from (meth)acrylate polymers containing pendant alkoxysilyl groups are described in U.S. Pat. No. 4,491,650, which issued on Jan. 1, 1985. The polymers are prepared by reacting a poly(meth)acrylate containing pendant hydroxyl groups with an isocyanato-functional alkoxysilane.

Canadian Patent No. 2,069,564, which issued on Dec. 14, 1992 describes primer compositions containing an alkoxysilane that optionally contain a reactive organic group bonded to silicon, an organotitanate and a tin salt of a carboxylic acid.

Primer compositions containing an organotitanate in combination with either an organosilicon compound containing at least 2 silicon-bonded alkoxy groups or an organohydrogensiloxane that optionally contains silicon bonded alkoxy groups are described in U.S. Pat. No. 4,749,471.

Japanese patent publication no. 86/004865 describes primer compositions containing an organosilicon resin, an organohydrogensiloxane and an organotitanate.

Japanese patent publication no. 91/031266 describes a primer for the copier rolls of an electrostatic copier. The primer contains an organosilicon compound with alkenyl groups, an organohydrogensiloxane, a platinum-containing hydrosilation catalyst and an organotitanate.

Applicant's copending applications Ser. Nos. 08/160,132 and 08/160,134, both filed on Dec. 2, 1994 describe adhesion promoters wherein one of the ingredients is a copolymer of the class described in the aforementioned '800 patent and contains repeating units derived from a) an ethylenically unsaturated organic compound and b) a silane containing an ethylenically unsaturated group. Compositions that cure by a platinum-catalyzed hydrosilation reaction in the presence of a platinum group metal or a compound thereof at temperatures of at least 70° C. require an organohydrogensiloxane in addition to the aforementioned copolymer. When the compsition is cured at lower termperatures the presence of an alkyl orthosilicate and an organotitanate is required to achieve adequate bonding to the substrate, resulting in failure within the cured elastomer rather than at the interface between the elastomer and the substrate.

Subsequent work by the present inventor revealed that the best adhesion to both types of curable organosiloxane compositions described in the aforementioned copending patent applications to a variety of substrates was achieved using tetra(2-methoxyethyl)silane, also referred to as methylcellosolve orthosilicate. A disadvantage associated with use of this silane is the relatively high toxicity ascribed to the 2-methoxyethanol generated during hydrolysis of the silane.

One objective of this invention is to define a class of adhesion promoting compositions that will cohesively bond organic polymers to organosiloxane materials, particularly elastomers and resins, that are in contact with the primer layer during curing of these materials. The adhesion promoting compositions do not contain any of the organosiloxane compounds considered objectionable based on the relatively high toxicity of intermediates and/or by-products associated with these compounds.

SUMMARY OF THE INVENTION

The objectives of the present invention are achieved using liquid adhesion-promoting composition comprising (A) a copolymer derived from at least one ethylenically unsaturated organic compound and at least one silane containing an ethylenically unsaturated organic group and at least two silicon-bonded hydrolyzable groups per molecule, (B) an organohydrogensiloxane, (C) an aminosilane containing at least 2 alkoxy or other hydrolyzable groups and (D) a solvent for ingredients A, B and C of said composition.

The adhesion promoting compositions are particularly effective for achieving bonding between 1) organosiloxane elastomers cured either by the reaction of silanol groups with alkoxy or other hydrolyzable group in presence of atmospheric moisture or by a platinum group metal-catalyzed hydrosilation reaction and 2) organic polymers, particularly amorphous or "glassy" types of organic polymers such as polymethyl methacrylate and polycarbonates used for windows, wind screens, and other structures requiring optical clarity.

DETAILED DESCRIPTION OF THE INVENTION

This invention provides adhesion-promoting compositions for bonding an organic polymer substrate to a layer of cured organosiloxane material during curing of said material, wherein said composition comprises A) from 5 to 20 parts by weight of a copolymer comprising repeating units derived from a) an ethylenically unsaturated organic compound, and b) a silane of the formula $YR^1_aSiX_{3-a}$, where $R^1$ is selected from the group consisting of monovalent unsubstituted and substituted hydrocarbon radicals, X represents a hydrolyzable group, Y represents an ethylenically unsaturated organic group that is bonded to the silicon atom by an alkylene radical, and a is 0 or 1;

B) from 0.5 to 2 parts by weight of an organohydrogensiloxane containing an average of at least three silicon bonded hydrogen atoms per molecule;

C) from 4 to 10 parts of a silane wherein the silicon atom is bonded to at least one aminoalkyl radical and at least two hydrolyzable groups; and D) an amount of an organic liquid sufficient to solubilize ingredients A, B and C.

This invention also relates to a method for bonding organic polymers to organosiloxane materials such as elastomers and resins during curing of the materials by a reaction selected from the group consisting of a) reactions of silanol groups with silicon-bonded hydrolyzable groups in the presence of water and a suitable catalyst and b) hydrosilation reactions catalyzed by metals from the platinum group of the periodic table. The method comprises the sequential steps of 1) coating the bonding surface of at least one of the organic polymer and the uncured organosiloxane material with an adhesion-promoting composition of the present invention, 2) allowing any volatile materials from the adhesion promoting composition to evaporate, 3) placing the bonding surfaces of the organic polymer and the curable organosiloxane material in contact with one another and 4) curing the organosiloxane material, wherein compositions curable by a hydrosilation reaction are cured at a temperature of at least 70° C. and compositions curable in the presence of moisture are typically cured at about 25° C. and a relative humidity of at least 25%.

This invention also provides a laminate comprising a layer of an organic polymer and a layer of an organosiloxane material cured by a reaction selected from the group consisting of hydrosilation reactions conducted in the presence of a catalyst selected from the group consisting of metals from the platinum group of the periodic table and compounds of said metals, and reactions of silanol groups with silicon-bonded hydrolyzable groups in the presence of moisture and a suitable catalyst, where the layers of said laminate are cohesively bonded together curing of said organosiloxane material by one of the present adhesion-promoting compositions.

The ingredients of the present adhesion-promoting compositions will now be described in detail.

The Organic/Organosiloxane Copolymer (Ingredient A)

The organic/organosiloxane copolymer, referred to as ingredient A of the present adhesion-promoting compositions, comprises repeating units derived from 1) at least one silane containing an average of at least two silicon-bonded hydrolyzable groups and one ethylenically unsaturated organic group per molecule and 2) at least one ethylenically unsaturated organic compound that is copolymerizable with said silane by a free radical reaction.

Copolymers corresponding to the definition of ingredient A and methods for preparing them are described in U.S. Pat. No. 3,306,800, which issued to Edwin Plueddemann on Feb. 28, 1967 and is incorporated herein in its entirety by reference as a teaching of preparing the copolymers referred to as ingredient A in the present specification.

The ethylenically unsaturated organic compound used to prepare Ingredient A can be any organic compound containing at least one polymerizable carbon-to-carbon double bond per molecule. Suitable classes of ethylenically unsaturated compounds include but are not limited to 1) hydrocarbons such as ethylene, propylene, butadiene and styrene, and 2) esters derived from ethylenically unsaturated carboxylic acids or alcohols. Preferred esters are reaction products of acrylic and methacrylic acid and at least one monohydric alcohol that is free of ethylenic unsaturation and contains from 1 to about 5 carbon atoms.

The other class of reactants used to prepare the copolymers referred to as ingredient A are silanes containing at least two silicon-bonded hydrolyzable groups and an ethylenically unsaturated group bonded to silicon through carbon. These silanes can be represented by the formula

$$YR^1_aSiX_{3-a}$$

where $R^1$ represents an unsubstituted or substituted monovalent hydrocarbon radical, X represents a hydrolyzable group, Y represents an ethylenically unsaturated organic group that is bonded to the silicon atom of the silane through an alkylene radical, and a is 0 or 1.

The monovalent hydrocarbon radicals represented by $R^1$ can be alkyl such as methyl or ethyl, cycloalkyl such as cyclohexyl, aryl such as phenyl. If substituents are present, these are preferably halogen atoms. Preferred hydrocarbon radicals are alkyl containing from 1 to 4 carbon atoms, phenyl and 3,3,3-trifluoropropyl, this preference being based on the availability of the chlorosilanes or other intermediates used to prepare ingredient A.

In preferred embodiments of the silane reactant X represents an alkoxy group containing from 1 to about 5 carbon atoms, Y represents a (meth)acryloxyalkyl group and a is 0. Most preferably X is methoxy or ethoxy and Y is 3-methacryloxypropyl. When R1 is present, it is most preferably methyl.

When preparing the copolymer, the molar ratio of the ethylenically unsaturated organic compound to the silane reactant is typically from about 10:1 to 30:1. This ratio is preferably about 20:1, which is equivalent to 95 mole percent of the organic compound, based on total monomers. The reactants used to prepare the copolymer preferably include about one mole percent, based on total reactants, of a mercapto-functional silane such as 3-mercaptopropyltrimethoxysilane as a chain terminating agent to control the molecular weight of the copolymer.

The copolymer referred to as ingredient A is typically prepared by a free radical initiated polymerization of the two ethylenically unsaturated reactants. The free radicals can be generated photochemically by decomposition of a photoinitiator in the presence of ultraviolet light or by the thermally induced decomposition of an organic peroxide. Methods for conducting free radical polymerizations are sufficiently well known that a detailed discussion is not required as part of the present specification. Specific procedures for preparing ingredient A are described in the aforementioned U.S. Pat. No. 3,306,800.

The copolymer constitutes at least 5 weight percent, preferably from 10 to about 50 weight percent, of the present adhesion-promoting compositions.

The Organohydrogensiloxane (Ingredient B)

The second ingredient, referred to as ingredient B, of the present adhesion promoting compositions is an organohydrogensiloxane that contains an average of at least three silicon-bonded hydrogen atoms per molecule.

The silicon-bonded organic groups present in ingredient B are selected from the same group of monovalent hydrocarbon and substituted hydrocarbon radicals referred to in the definition of the $R^1$ of the silane reactant used to prepare ingredient A, with the proviso that the organic groups in ingredient B must be substantially free of ethylenic or acetylenic unsaturation. If more than one hydrocarbon radical is present on any one silicon atom of ingredient B, these can be identical or different. The silicon-bonded hydrocarbon radicals are preferably alkyl containing from 1 to 4 carbon atoms, phenyl or 3,3,3-trifluoropropyl. Most preferably at least one of the hydrocarbon radicals bonded to each silicon atom is methyl.

The molecular structure of ingredient B can be straight chain, branch-containing straight chain, cyclic, or network.

The silicon-bonded hydrogen atoms in ingredient B can be located on the terminal and/or the non-terminal silicon atoms of the siloxane molecule. Preferably from about 80 to 100 percent of the non-terminal siloxane units contain a silicon-bonded hydrogen atom and substantially none contain more than 1. If at least about 80 percent of the non-terminal siloxane units of this ingredient do not contain a silicon-bonded hydrogen atom, it appears that the strong cohesive bonding characteristic of the present compositions is not achieved.

While the molecular weight of ingredient B is not specifically restricted, viscosities in the range of 3 to 10,000 centipoise (0.003 to 10 Pa.s) at 25 degrees Centigrade are preferred.

The organohydrogensiloxane constitutes from 0.5 to about 2 percent, preferably from 0.8 to about 1.2 percent, by weight of the present adhesion-promoting composition when a solvent is present. The organohydrogensiloxane appears to have limited solubility in these compositions, and can become incompatible at concentrations above about 2 weight percent The Aminoalkylsilane The third reactive ingredient of the present adhesion promoting compositions is an aminoalkyl silane that can be represented by the general formula $R^3R^4NR^2SiX_3$ where $R^2$ represents an alkenyl radical, $R^3$ represents a hydrogen atom or a hydrocarbon radical, $R^4$ is selected from the group consisting of $R^3$ and aminoalkyl radicals and X represents a hydrolyzable group. In preferred embodiments of the aminoalkyl silane $R^2$ contains from 1 to about 4 carbon atoms, $R^3$ is hydrogen or alkyl and $R^4$ is hydrogen, alkyl or γ-aminoalkyl. Most preferably the aminoalkyl radical is 3-aminopropyl or 3-(β-aminoethylamino)propyl.

The hydrolyzable groups represented by X can be any of the conventional hydrolyzable groups present in silanes. In the presence of moisture these groups are replaced by silanol groups that can condense under the proper conditions to form siloxane (=Si—O—Si=) bonds. The hydrolysis is typically a reversible reaction. The extent to which the forward reaction (silanol formation) is favored is a function of a number of variables, including temperature and the ease with which the by-product of the hydrolysis reaction, typically a compound of the formula XH, can be removed from the reaction site. Suitable hydrolyzable groups that can be represented by X include but are not limited to alkoxy such as methoxy and ethoxy; enoloxy such as isopropenyloxy; carboxy such as acetoxy; ketoximo such as methylethylketoximo and amidoxy such as acetamidoxy. Alkoxy are the preferred hydrolyzable group based on the cost and availability of the starting materials, the reactivity of these hydrolyzable groups, and the relatively low toxicity and corrosivity of the alcohols evolved as a by-product of the hydrolysis reaction.

The Organic Liquid (Ingredient D)

The present adhesion promoting compositions include up to 90 percent by weight or more, based on the weight of the total composition, of an organic liquid that is a solvent for all of the ingredients of the composition, with the exception of any fillers that may be present, and will not react with these ingredients. In addition to serving as a solvent for ingredients A, B and C of the present compositions, the solvent functions as a diluent, allowing the viscosity to be adjusted to a level to obtain uniform coatings of the desired thickness with the selected application method.

Preferred organic solvents have a vapor pressure of at least 100 mm. Hg at 25° C., allowing them to evaporate relatively rapidly under ambient conditions. Suitable organic solvents include but are not limited to hydrocarbons such as pentane, hexane, toluene and xylene. Ethylenically unsaturated alcohols such as 1-butenol and 2-methyl-3-buten-2-ol are particularly preferred. The adhesion obtained using saturated alcohols such as isopropanol and liquid hydrocarbons as solvents may not be as consistent as the adhesion obtained using an unsaturated alcohol.

The solvent preferably constitutes from 70 to 90 weight percent of the composition.

Preparation and Use of the Present Adhesion Promoting Compositions

The present adhesion promoting compositions are prepared by blending ingredients A, B, C and D until a homogeneous solution is obtained.

The present inventor discovered that the adhesion imparted by the present compositions decreased when the compositions were stored for several days prior to being applied as primers. When it is desired to store the present compositions for more than 24 hours prior to use the compositions should be packaged in two containers with ingredients A (the organic/organosiloxane copolymer) and ingredient D (the aminosilane) located in separate containers.

The present adhesion promoting compositions are used as primers by applying the composition as a thin coating to at least one of the mating surfaces to be bonded. After the solvent has evaporated and sufficient time has elapsed to allow at least partial hydrolysis of the alkoxy groups present in ingredients A and C in the presence of atmospheric moisture, the mating surfaces of the substrates are placed in contact with one another.

The present compositions can be applied using any of the conventional coating methods, including but not limited to wiping, brushing, spraying and dipping.

One of the two major classes of organosiloxane materials that can be bonded to organic polymer substrates using the present adhesion promoting compositions cure by a platinum group metal catalyzed hydrosilation reaction. The ingredients of these curable compositions typically include a liquid or gum type polyorganosiloxane containing at least two alkenyl radicals per molecule, an organohydrogensiloxane containing at least two silicon-bonded hydrogen atoms per molecule and a platinum group metal or a compound of one of these metals as a hydrosilation catalyst. If it is desired to obtain a crosslinked elastomer or other material following curing of the composition, the sum of the average number of alkenyl radicals present in a molecule of the polyorganosiloxane and the average number of silicon-bonded hydrogen atoms present in a molecule of the organohydrogensiloxane must be greater than 4.

The ingredients of organosiloxane compositions that are cured by a platinum catalyzed hydrosilation reaction are sufficiently well known that a detailed discussion in this specification is not required. Curable organosiloxane compositions of this type are described in greater detail in U.S. Pat. No. 5,110,845, which is incorporated in its entirety by reference. A preferred composition is described in the example that forms part of this specification.

The second major class of organosiloxane materials whose adhesion to organic polymer substrates can be improved using the present adhesion promoting compositions cure in the presence of moisture by the reaction of a polyorganosiloxane containing at least two silanol groups per molecule with an organosilicon compound containing at least three silicon-bonded alkoxy or other hydrolyzable groups. In some curable compositions the silanol groups can be replaced by silicon-bonded hydrolyzable groups such as acyloxy, alkoxy, ketoximo and aminoxy. This is particularly true when the curing catalyst is an organotitanium compound.

Curing agents for the polyorganosiloxane ingredient of the moisture curable organosiloxane compositions are typically organosilicon compounds containing an average of at least three silicon-bonded hydrolyzable groups per molecule. Preferred hydrolyzable groups are alkoxy containing from 1 to about 4 carbon atoms, acetoxy and ketoximo such as methylethylketoximo. A catalyst such as a tin or organotitanium compound is typically included to accelerate the curing reaction.

The organosilicon compound that serves as the curing agent can be a silane containing three or four hydrolyzable groups per molecule, hydrolysis/condensation products of these silanes, including but not limited to disiloxanes and alkyl polysilicates. Alternatively, the curing agent can be a polyorganosiloxane. Silanes, particularly alkkoxysilanes, and their hydrolysis/condensation products are generally preferred, based on their cost and availability. Preferred silanes include but are not limited to methyltrimethoxysilane, methyltriethoxysilane, methyltriacetoxysilane, and methyltri(methylethylketoximo)silane.

The polyorganosiloxanes containing at least two silanol groups or alkenyl radicals per molecule can be linear or branched. The repeating units of the polyorganosiloxanes can be represented by the general formula $R^5_b SiO_{4-b/2}$, where $R^5$ represents an unsubstituted or substituted monovalent hydrocarbon radical and b is 1 or 2. When b is 2 the hydrocarbon radicals represented by $R^5$ can be identical or different. Hydrocarbon radicals that can be represented by $R^5$ include but are not limited to alkyl such as methyl and ethyl, substituted alkyl such as chloromethyl and 3,3,3-trifluoropropyl, cycloalkyl such as cyclohexyl, aryl such as phenyl, and aralkyl such as benzyl.

The present inventor discovered that certain moisture curable organosiloxane compositions will cohesively bond to organic polymer substrates using primer compositions containing only the organic/organosiloxane copolymer, ingredient A, and the organohydrogensiloxane, referred to as ingredient B of the present primer compositions without the presence of the amino-functional silane, ingredient C.

One of the factors that appears to influence the strength of the bonding that develops during curing of the organosiloxane composition is the molecular weight of the curable polyorganosiloxane. Other factors may be the type of curing agent and any fillers present in the curable composition.

The curable organosiloxane compositions used with the present adhesion-promoting compositions can include additional ingredients to modify the physical properties or other attributes of cured materials prepared from the compositions or to improve the processability of the compositions. Typical ingredients include but are not limited to reinforcing and non-reinforcing fillers, treating agents for the fillers, resinous organosiloxane copolymers, curing catalyst inhibitors and accelerators, dyes, pigments, adhesion promoters, heat stabilizers and flame retarding agents.

The conditions required to cure the organosiloxane material while cohesively bonding it to the organic polymer substrate using the present adhesion-promoting compositions will depend upon the type of curing reaction. Compositions containing a silane with at least two hydrolyzable groups as the curing agent will develop adhesion to the substrate when cured under ambient conditions, typically 25° C. and at least 25 percent relative humidity. A relative humidity of at least 50 percent is preferred.

Organosiloxane compositions that cure by a platinum-catalyzed hydrosilation reaction typically require heating at temperatures from 70° to about 150° C. to achieve cohesive bonding to the substrate. Adhesion between some substrates can be maximized if external pressure is applied to maintain the bonding surfaces in close contact during curing of the organosiloxane composition.

To preserve integrity of the composite it should be understood that the temperature to which the composite is heated should be below the glass transition temperature of the organic polymer.

The Organic Polymer Substrate

Organic polymers that can be bonded to organosiloxane materials using the adhesion promoting compositions of this invention are not restricted. Suitable polymers include but are not limited to: addition type polymers, including polyolefins such as polyethylene and polypropylene, polymers derived from other ethylenically unsaturated organic compounds such as styrene and esters of ethylenically unsaturated acids, such as lower alkyl eaters of acrylic and methacrylic acids; condensation type polymers, including polyesters such and polyethylene terephthalate, polybutylene terephthalate, polyamides and polycarbonates.

The present adhesion promoting compositions are particularly suitable for bonding optically transparent amorphous polymers such as polymethyl methacrylate and polycarbonates using optically transparent sheets of organosiloxane elastomers that cure by a platinum catalyzed hydrosilation reaction or by the reaction of alkoxy-functional silanes with polyorganosiloxanes containing two silanol groups per molecule.

A preferred class of polycarbonates are prepared from phosgene and bis-phenols such as Bisphenol A, 2,2-bis(4-hydroxyphenyl)propane.

The following examples describe preferred adhesion promoting compositions, curable organosiloxanes and organic polymers that can be used to form the present composites, and should not be interpreted as limiting the invention described in the accompanying claims. Unless otherwise specified all parts and percentages in the examples are by weight and viscosities were measured at 25° C.

Primer compositions were prepared by blending the ingredients, including the methylbutenol solvent, to homogeneity, which typically required about ten seconds of mixing.

A copolymer of methylmethacrylate and 3-methacryloxypropyltrimethoxysilane, referred to hereinafter as "MMA/MPTMS" or "copolymer" was prepared by reacting methyl methacrylate and 3-methacryloxypropyltrimethoxysilane in a molar ratio of 10:1, respectively, in the presence of 1 percent by weight, based on total monomers, of mercaptopropyltrimethoxysilane and 1 percent by weight of benzoyl peroxide. These reactants were dissolved or suspended in an amount of ethyl acetate equivalent to 79 weight percent of the total mixture.

The organic polymers used as the substrates to which the primer compositions and the curable organosiloxane elastomers were applied were optically transparent sheets of polymethyl methacrylate (PMMA) and a bis-phenol A type of polycarbonate (PC). The sheets measured 5 by 15 cm.

The test samples used to evaluate adhesion were prepared by cleaning the organic polymer substrate using methanol, at which time the 2 drops of the primer composition to be evaluated were applied to about a 1 square inch (6.45 cm2) area on one surface of each substrate. The solvent then was allowed to evaporate for 60 minutes at a temperature of 25° C. and a relative humidity of 50%.

The curable organosiloxane composition was then applied over the primer as a layer of about 0.060 inch (1.5 mm.) in thickness. The curable organosiloxane composition referred to hereinafter as composition I was cured by heating it at 100° C. for two hours, composition II was cured during a 24 hour exposure at a temperature of 25° C. and a relative humidity of 50%. The curable organosiloxane composition referred to hereinafter as composition III was cured by exposing it for 3 days to a temperature of 25° C. and a relative humidity of 50%.

The adhesion of the cured elastomer was evaluated by making a series of parallel incisions through this entire thickness of the cured elastomer using a razor blade. The incisions were spaced from 0.125 to 0.25 inch (0.32 to 0.64 cm.) apart. A metal spatula was then inserted in the area of the incisions and used to pry the cured elastomer away from the organic polymer substrate. If the cured material tore without separating from surface of the substrate at the interface, this was rated as 100 percent cohesive failure. If cured elastomer could be removed from the substrate intact without tearing and without leaving any of the elastomer adhering to the surface of the substrate, this was rated as 0 % cohesive failure.

The curable organosiloxane compositions identified as I, II and III were prepared by blending the following ingredients to homogeneity.

Composition I 56 parts of a dimethylvinylsiloxy-terminated polydimethylsiloxane gum containing 0.142 mole percent of methylvinylsiloxy units and exhibiting a Williams plasticity of from 1.4 to 1.7 mm.;

10 part of a hydroxyl-terminated polydimethylsiloxane exhibiting a Williams plasticity of about 152;

33 parts of a wet process treated silica prepared as described in U.S. Pat. No. 4,344,800 which issued to M. Lutz on Aug. 17, 1982 and is hereby incorporated by reference as a teaching of the method for preparing the silica;

0.8 part of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent;

0.2 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent;

0.4 part of 3-methacryloxypropyltrimethoxysilane;

0.6 parts of ethynylcyclohexanol as an inhibitor for the platinum-containing catalyst; and 0.09 part of cyclic methylvinylsiloxanes.

Composition II 55 parts of a silanol-terminated polydimethylsiloxane exhibiting a viscosity of 4 Pa.s;

25 parts of zinc oxide;

17.1 parts of diatomaceous earth;

2 parts of hydrogenated castor oil;

1.4 part of ethyl polysilicate;

0.1 part dibutyltin diacetate;

0.2 parts titanium dioxide; and 6.6 parts of a trimethylsiloxy-terminated polydimethylsiloxane exhibiting a viscosity of 1 Pa.s Composition III 68 parts of a hydroxyl-terminated polydimethylsiloxanes exhibiting a viscosity of about 13 Pa.s;

1.4 parts of titanium dioxide;

0.1 part of carbon black 23 parts of treated silica containing trimethylsiloxy groups;

0.07 part of copper acetylacetonate;

7 parts of methyltrimethoxysilane; and 0.5 part of 2,5-di-isopropoxy-bis-ethylacetoacetate titanium

EXAMPLE 1

This example demonstrates the ability of the present adhesion promoting compositions to achieve 100 percent cohesive failure between cured organosiloxane elastomers and either polymethyl methacrylate or a polycarbonate.

Primer compositions were prepared by blending a 5 percent by weight solution of the MMA/MPTMS copolymer (ingredient A1) in 2-methyl-3-buten-2-ol, referred to hereinafter as methylbutenol, with 1 percent, based on the weight of the solution, of a trimethylsiloxy terminated methylhydrogensiloxane containing 1.6 weight percent of silicon-bonded hydrogen (ingredient B1) and the quantity of 3-(β-aminoethylamino)propyltrimethoxysilane recorded in Table 1. Three of the compositions evaluated contained additional copolymer, referred to as MMA/MPTMS. The results of the adhesion tests performed on the cured elastomers are also recorded in Table 1.

TABLE 1

| Weight Percent Aminosilane | Percent Cohesive Failure Compositions | | |
|---|---|---|---|
| | I | II | III |
| 0 | 0 | 0 | 100 |
| 1 | 0 | 0 | 100 |
| 2 | 50 | 40 | 100 |
| 4 | 80 | 10 | 100 |

TABLE 1-continued

| Weight Percent Aminosilane | Percent Cohesive Failure Compositions | | |
|---|---|---|---|
| | I | II | III |
| 6 | 95 | 100 | 100 |
| 10 | 90 | 70 | 100 |
| 6 + 5% Copolymer | 100 | 100 | 100 |
| 6 + 10% Copolymer | 100 | 100 | 100 |

The data in Table 1 demonstrate an increase in adhesion for samples I and II with increasing concentration of aminosilane up to a level of between 6 and 10 weight percent, at which point the adhesion, measured as percent cohesive failure, began to decrease. The adhesion at an aminosilane concentration of 10 percent was improved to 100 percent cohesive failure on substrates I and II by the presence of an additional 5 weight percent of the MMA/MPMTMS copolymer. The organosiloxane composition referred to as Sample III exhibited cohesive failure using only the copolymer (ingredient A1) and the organohydrogensiloxane.

That which is claimed is:

1. A method for bonding an organic polymer to a cured organosiloxane material during curing of said material by a reaction selected from the group consisting of a) reactions of silanol groups with silicon-bonded hydrolyzable groups in the presence of moisture and a suitable catalyst and b) hydrosilation reactions catalyzed by metals from the platinum group of the periodic table and compounds of said metals, said method comprising the sequential steps of 1) coating the bonding surface of at least one of the organic polymer and the uncured organosiloxane material with an adhesion-promoting composition comprising A) from 5 to 50 parts by weight of a copolymer comprising units derived from a) an ethylenically unsaturated organic compound, and b) a silane of the formula $YR^1_aSiX_{3-a}$, where $R^1$ represents a monovalent hydrocarbon radical, X represents a hydrolyzable group, Y represents an ethylenically unsaturated organic group that is bonded to the silicon atom of said silane through an alkylene radical, and a is 0 or 1;

B) from 0.5 to 2 parts by weight of an organohydrogensiloxane containing an average of at least three silicon bonded hydrogen atoms per molecule;

C) from 4 to 10 parts of a silane wherein the silicon atom is bonded to at least one aminoalkyl radical and at least two hydrolyzable groups; and D) an amount of an organic liquid sufficient to solubilize ingredients A, B and C;

2) allowing the volatile materials from the adhesion promoting composition to evaporate, 3) placing the bonding surfaces of the organic polymer and the curable organosiloxane material in contact with one another and 4) curing the organosiloxane material, wherein compositions curable by a hydrosilation reaction are cured at a temperature of at least 70° C. and compositions curable in the presence of moisture are cured at about 25° C. and a relative humidity of at least 25%.

2. A method according to claim 1 wherein the molar ratio of units in said copolymer derived from the ethylenically unsaturated organic compound to units derived from the silane is from 10:1 to 30:1, said ethylenically unsaturated organic compound is an ester derived from an ethylenically unsaturated carboxylic acid and a monohydric alcohol, said organohydrogensiloxane constitutes from 0.8 to 1.2 weight percent of said composition, said aminosilane exhibits the formula $R^3R^4NR^2SiX_3$ wherein $R^2$ represents an alkylene radical, $R^3$ is selected from the group consisting of the hydrogen atom and monovalent hydrocarbon radicals, $R^4$ is selected from the group consisting of $R^3$ and aminoalkyl radicals and X represents a hydrolyzable group.

3. A method according to claim 2 wherein said carboxylic acid is selected from the group consisting of acrylic and methacrylic acids, $R^2$ contains from 1 to 4 carbon atoms, $R^3$ is selected from the hydrogen atom or alkyl radicals, and $R^4$ is selected from hydrogen, alkyl radicals or γ-aminoalkyl radicals.

4. A method according to claim 3 wherein $R^4$ is selected from 3-aminopropyl or 3-(β-aminoethylamino)propyl, said organic polymer is selected from polycarbonates or polyalkyl methyacrylates, said ethylenically unsaturated organic compound is an alkyl ester of methacrylic acid, $R^1$ is methyl, $R^2$ is methyl or alkoxymethyl, X is an alkoxy group and Y is $CH_2=C(R^3)C(O)O(CH_2)_3-$ where $R^3$ is selected from hydrogen or methyl, said organohydrogensiloxane is a triorganosiloxy-terminated alkylhydrogensiloxane and said organic liquid is selected from the group consisting of liquid hydrocarbons and alcohols.

5. A method according to claim 4 wherein said polyalkyl methacrylate is methyl methacrylate, said ethylenically unsaturated organic compound is methyl methacrylate, said polycarbonate is derived from bis-phenol A, the alkyl radicals present in said organohydrogensiloxane are methyl, and said organic liquid is an alcohol containing from 1 to 10 carbon atoms and constitutes from 70 to 90 weight percent of said adhesion-promoting composition.

6. A method according to claim 5 wherein said organic liquid is an ethylenically unsaturated alcohol.

* * * * *